United States Patent Office.

JESSE K. MARSH, OF TERRE HAUTE, INDIANA.

Letters Patent No. 62,432, dated February 26, 1867.

IMPROVED PROCESS OF PRESERVING EGGS.

*The Schedule referred to in these Letters Patent and making part of the same.*

TO ALL WHOM IT MAY CONCERN:

Be it known that I, JESSE K. MARSH, of Terre Haute, in the county of Vigo, and State of Indiana, have invented a new and useful improvement in Process for Preserving Eggs; and I do hereby declare that the following is a full, clear, and exact description thereof, which will enable others skilled in the art to fully understand and make use of the same.

It is well known that various compositions and solutions are in use for the preservation of eggs, whereby the pores of the shell are filled and the air excluded, thereby preserving the egg from decomposition to a certain degree. The manner in which such solutions, (however valuable in themselves,) have been applied hitherto has only insued partial success from the fact that the ingredients of the composition are allowed to settle to the lower portion of the vessel containing it, thus leaving one portion of the eggs but partly protected by the solution, while the other or lower portion would have a surplus. Another difficulty has always been experienced under the old method. The egg itself settles by remaining for a long time in one position or with the same side up. The heavy albumen of the egg, or the "white" settles to the bottom of the shell while the yolk rises and is frequently found adhering to the membrane. Eggs in this condition, although they may not be actually spoiled, are considered stale and unmarketable. The common method of applying the best of compositions, (that, for instance, for which Mrs. Nancy Patton obtained a patent in January, 1866,) renders it only partially effective in preserving the eggs. Other compositions applied in the old way are liable to the same objections and perhaps to a greater degree than hers. Experience has taught me a better way to apply any solution, and having discovered the way to overcome all difficulties in the preservation of eggs, I proceed as follows:

I take a water-tight vessel or cask and remove one head and pack it closely with eggs until it is full; I then replace the head and pour the solution through the bung-hole as long as the vessel will receive it, or a sufficient quantity to cover the eggs. I then close the cask or vessel tight and roll it or agitate the contents of the vessel until every egg is thoroughly covered with the liquid. With the eggs confined in this manner the casks may be rolled over, and the position of each of the eggs changed occasionally, while the solution is prevented from settling in any one portion of the cask, and evaporation is also prevented, not only from the eggs but from the liquid. The agitation of the liquid surrounding the eggs is the essential point and the most important feature of my invention, and it is obvious that this may be done in other ways than those described.

What I claim as new, and desire to secure by Letters Patent, is—

Applying a composition or solution for the preservation of eggs, substantially as herein described, and agitating the same as and for the purposes set forth.

JESSE K. MARSH.

Witnesses:
   V. A. SPARKS,
   P. SHANNON.